July 21, 1942.   E. E. WELLER   2,290,459
FASTENING ATTACHMENT FOR FISHHOOKS OR BAITS Filed July 12, 1940

INVENTOR.
Erwin E. Weller
BY Sam J. Slotsky
ATTORNEY.

Patented July 21, 1942

2,290,459

UNITED STATES PATENT OFFICE 2,290,459

FASTENING ATTACHMENT FOR FISHHOOKS OR BAITS

Erwin E. Weller, Sioux City, Iowa

Application July 12, 1940, Serial No. 345,121

1 Claim. (Cl. 43—28)

My invention relates to a fastening attachment more specifically to be used on fish hooks or baits.

An object of my invention is to provide a fastening attachment which can be readily put in place or readily removed.

A further object of my invention is to provide an attachment of this type which after placement will be locked in position to prevent removal of the fastening device.

A further object of my invention is to provide a very simple attachment which can be manufactured at a very reasonable cost.

With these and other objects in view, my invention consists in the construction, arrangement and combination of the various parts of my device, whereby the objects contemplated are attained, as hereinafter more fully set forth, pointed out in my claim, and illustrated in the accompanying drawing, in which:

Figure 1:
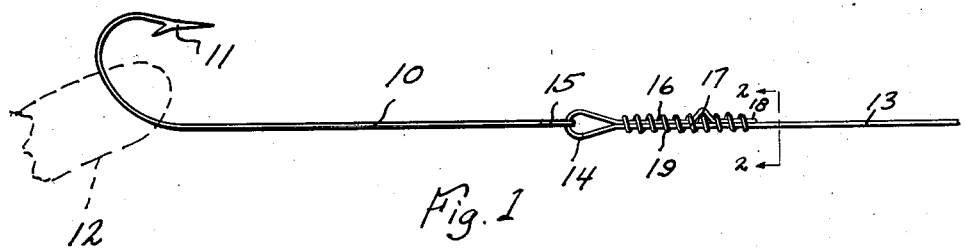
Figure 1 is a side elevation of the fastener as attached to a fish hook.
Figure 2:
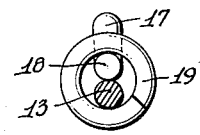
Figure 2 is an enlarged sectional view taken along the lines 2—2 of Figure 1.
Figure 3:
Figure 3 is a detail of a portion of the fastening device.

I have used the character 10 to represent a fish hook having a barbed point 11 and upon which fish hook is affixed suitable bait of any kind 12. The fastening attachment comprises a wire member 13 which member extends into the looped portion 14 which looped portion is received within the eye 15 of the hook 10. The loop 14 extends into the upper wire portion 16 which merges into the bent or humped portion 17 which in turn continues into an integral portion 18.

A further portion of the fastening attachment is provided by means of the helically wound spring coil 19. The portions 16, 17 and 18 are normally in a position sprung away from the main wire body 13.

In using the fastening attachment, the portions 16, 17 and 18 are first placed through the eye of the hook 15 and are then held in snug position against the member 13. The helically wound member 19 which is first placed rearwardly on the member 13 is then brought forward on to the portion 18 and the member 19 is then rotated in a clockwise direction and the forward extremity 20 will then pass through the humped portion 17 and continued rotation of the member 19 will bring successive circular portions of the member 19 through the humped portion 17 so that the forward end of the attachment member 19 will then be brought to the position as shown in Figure 1 or adjacent to the loop 14, and the rearward end of the member 19 will then snugly encircle the portions 18 and 13.

It will be seen from this construction that the humped portion 17 prevents forward or rearward movement of the member 19 and the helical coil 19 itself provides a snug engagement of both the upper and lower portions of the member 13 so that as a result, a locking action is obtained which will effectively prevent either forward or rearward movement of the member 19. The only way that the member 19 can be removed is by moving the same in a rotational direction which effects will not be present when the hook or the bait is attached and after use or when changing hooks and the like the member 19 can be removed by a reverse rotation of the same.

As a result of the foregoing, it will be seen that I have provided a fastening attachment for fish hooks which can be easily attached, which is securely locked after attachment and which is of very simple construction.

Some changes may be made in the construction and arrangement of the parts of my invention without departing from the real spirit and purpose of my invention, and it is my intention to cover by my claim any modified forms of structure or use of mechanical equivalents, which may be reasonably included within its scope.

I claim as my invention:

A fastening attachment for fish hooks or baits comprising a wire member including a looped portion therein for attachment to a hook or bait, an integral portion extending from said loop normally in sprung outward position from said wire member, said extension having a humped portion therein, said humped portion being of a substantially inverted V shaped formation, and a helically wound attaching member adapted to enclose said extended portion and said wire member, a circular portion of said helically wound member adapted to be received within said hump portion and adapted to provide locking action thereto, said helical member being of a constant diameter throughout the length thereof.

ERWIN E. WELLER.